United States Patent
Liu et al.

(10) Patent No.: US 11,651,622 B2
(45) Date of Patent: May 16, 2023

(54) METHOD, DEVICE AND NON-TRANSITORY COMPUTER READABLE MEDIUM OF FACIAL RECOGNITION

(71) Applicant: GIGA-BYTE TECHNOLOGY CO., LTD., New Taipei (TW)

(72) Inventors: Yi-Sung Liu, New Taipei (TW); Kuo-Ting Chan, New Taipei (TW); Mao-Wei Tseng, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 490 days.

(21) Appl. No.: 16/713,894

(22) Filed: Dec. 13, 2019

(65) Prior Publication Data

US 2020/0193201 A1 Jun. 18, 2020

(30) Foreign Application Priority Data

Dec. 14, 2018 (TW) ................. 107145176

(51) Int. Cl.
*G06K 9/00* (2022.01)
*G06K 9/62* (2022.01)
(Continued)

(52) U.S. Cl.
CPC ............ *G06V 40/172* (2022.01); *G06F 18/22* (2023.01); *G06F 18/23* (2023.01); *G06V 10/761* (2022.01); *G06V 10/764* (2022.01); *G06V 40/50* (2022.01)

(58) Field of Classification Search
CPC .... G06K 9/6215; G06K 9/6218; G06K 9/627; G06V 40/172; G06V 40/50
See application file for complete search history.

(56) References Cited

U.S. PATENT DOCUMENTS

| 7,551,755 | B1 * | 6/2009 | Steinberg | ............. | G06V 40/161 |
| | | | | | 340/5.83 |
| 9,239,967 | B2 * | 1/2016 | Liu | ...................... | G06K 9/6219 |

(Continued)

FOREIGN PATENT DOCUMENTS

| JP | 2002-259980 A | 9/2002 | | |
| JP | 2014-526755 A | 10/2014 | | |
| WO | WO-2012140315 A1 * | 10/2012 | ......... | G06K 9/00288 |

OTHER PUBLICATIONS

European Search Report in Application No. 19215558.8 dated Apr. 29, 2020.

(Continued)

*Primary Examiner* — Michael J Vanchy, Jr.
(74) *Attorney, Agent, or Firm* — Maschoff Brennan

(57) ABSTRACT

A facial recognition method comprises obtaining an image to be recognized, determining whether the image to be recognized belongs to one of image groups of at least one user, determining whether an image number of a determined image group is less than a preset number when the image to be recognized belongs to the determined image group in the image groups, deleting one of facial images in the determined image group according to time parameters of the facial images in the determined image group and performing an image group updating procedure when the image number of the determined image group is not less than the preset number, and performing the image group updating procedure when the image number of the determined image group is less than the preset number.

11 Claims, 4 Drawing Sheets

(51) Int. Cl.
  *G06V 40/16* (2022.01)
  *G06V 40/50* (2022.01)
  *G06F 18/22* (2023.01)
  *G06F 18/23* (2023.01)
  *G06V 10/74* (2022.01)
  *G06V 10/764* (2022.01)

(56) References Cited

U.S. PATENT DOCUMENTS 10,025,950 B1 7/2018 Avasarala et al.
2018/0349736 A1* 12/2018 Bapat .................... G06V 40/10

OTHER PUBLICATIONS

Schroff et al., "FaceNet: A Unified Embedding for Face Recognition and Clustering", Jun. 17, 2015.
Wang et al., "Deep Face Recognition: A Survey" Sep. 28, 2015.
JP Office Action in Application No. 2019-225545 dated Dec. 22, 2020.

* cited by examiner

METHOD, DEVICE AND NON-TRANSITORY COMPUTER READABLE MEDIUM OF FACIAL RECOGNITION

CROSS-REFERENCE TO RELATED APPLICATIONS

This non-provisional application claims priority under 35 U.S.C. § 119(a) on Patent Application No(s). 107145176 filed in Taiwan, R.O.C. on Dec. 14, 2018, the entire contents of which are hereby incorporated by reference.

BACKGROUND

1. Technical Field

This disclosure relates to an image recognition method, and particularly to a facial recognition method.

2. Related Art

With the development of image recognition technology, the application of recognition technology of a face in an image has become more and more widespread. The airport identification system, access control system, attendance system, unattended store and other identity recognition systems can be combined with facial recognition technology. More specifically, by comparing with the facial images of the registered user in the database, the identity recognition system can determine the access right or identity of the current user (i.e. the user to be recognized).

However, if the user's face changes with time or the user's appearance changes due to wearing glasses, breads, etc. after the user registers in the system, the user have to re-register in the system with the new facial image, which is quite time-consuming and computational resources.

SUMMARY

According to an embodiment of this disclosure, a facial recognition method comprises obtaining an image to be recognized; determining whether the image to be recognized belongs to one of image groups of at least one user; when the image to be recognized belongs to a determined image group in the image groups, determining whether an image number of the determined image group is less than a preset number; when the image number of the determined image group is not less than the preset number, deleting one of facial images in the determined image group according to time parameters of the facial images in the determined image group, and performing an image group updating procedure; and when the image number of the determined image group is less than the preset number, performing the image group updating procedure.

According to an embodiment of this disclosure, a facial recognition device comprises an image capturing device, a database and a processor, wherein the processor is electrically connected with the image capturing device and the database. The image capturing device is configured to obtain an image to be recognized. The database is configured to store image groups of at least one user. The processor is configured to determine whether the image to be recognized belongs to one of the image groups of the at least one user, to determine whether an image number of a determined image group is less than a preset number when the image to be recognized belongs to the determined image group in the image groups, to delete one of facial images in the determined image group according to time parameters of the facial images in the determined image group and perform an image group updating procedure when the image number of the determined image group is not less than the preset number, and to perform the image group updating procedure when the image number of the determined image group is less than the preset number.

According to an embodiment of this disclosure, a non-transitory computer readable medium comprises a code, wherein the code is configured to be executed by one or more processors so as to perform the facial recognition method in the aforementioned embodiment.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
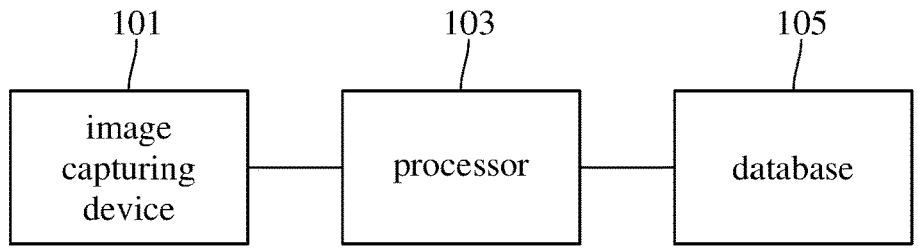
FIG. 1 is a functional block diagram of a facial recognition device according to an embodiment of this disclosure.

Please refer to FIG. 1, FIG. 1 is a functional block diagram of a facial recognition device 1 according to an embodiment of this disclosure. In one or more embodiments of this disclosure, the facial recognition device 1 can be included in a desktop computer, a laptop computer, a tablet computer, a mobile device or other electronic devices, and can be applied to a system having an identity recognition function or being controlled by facial recognition, such as an access control system, a security check system, an attendance system, an unattended store, etc., but is not limited thereto. As shown in FIG. 1, the facial recognition device 1 comprises an image capturing device 101, a processor 103 and a database 105, wherein the processor 103 is connected with the image capturing device 101 and the database 105, the connections between these components can be an electrical connection or a communication connection.

More specifically, the image capturing device 101 is, for example, a camera, an infrared thermal sensing lens or other device for capturing an image. The image capturing device 101 is configured to capture one or more facial images of one or more user and the image to be recognized. The images captured by the image capturing device 101 can be 2D images. The processor 103 is, for example, a central processing unit, and can include one or more graphics processing units (GPU). For facial recognition, the processor 103 processes the images captured by the image capturing device 101 by grouping and comparing. The database 105 is, for example, a memory or a cloud device, and is configured to store registration data of one or more users and the result of image grouping generated by the processor 103. For explaining the above mentioned grouping and comparing and their execution results, please refer to FIGS. 1 and 2.

Figure 2:
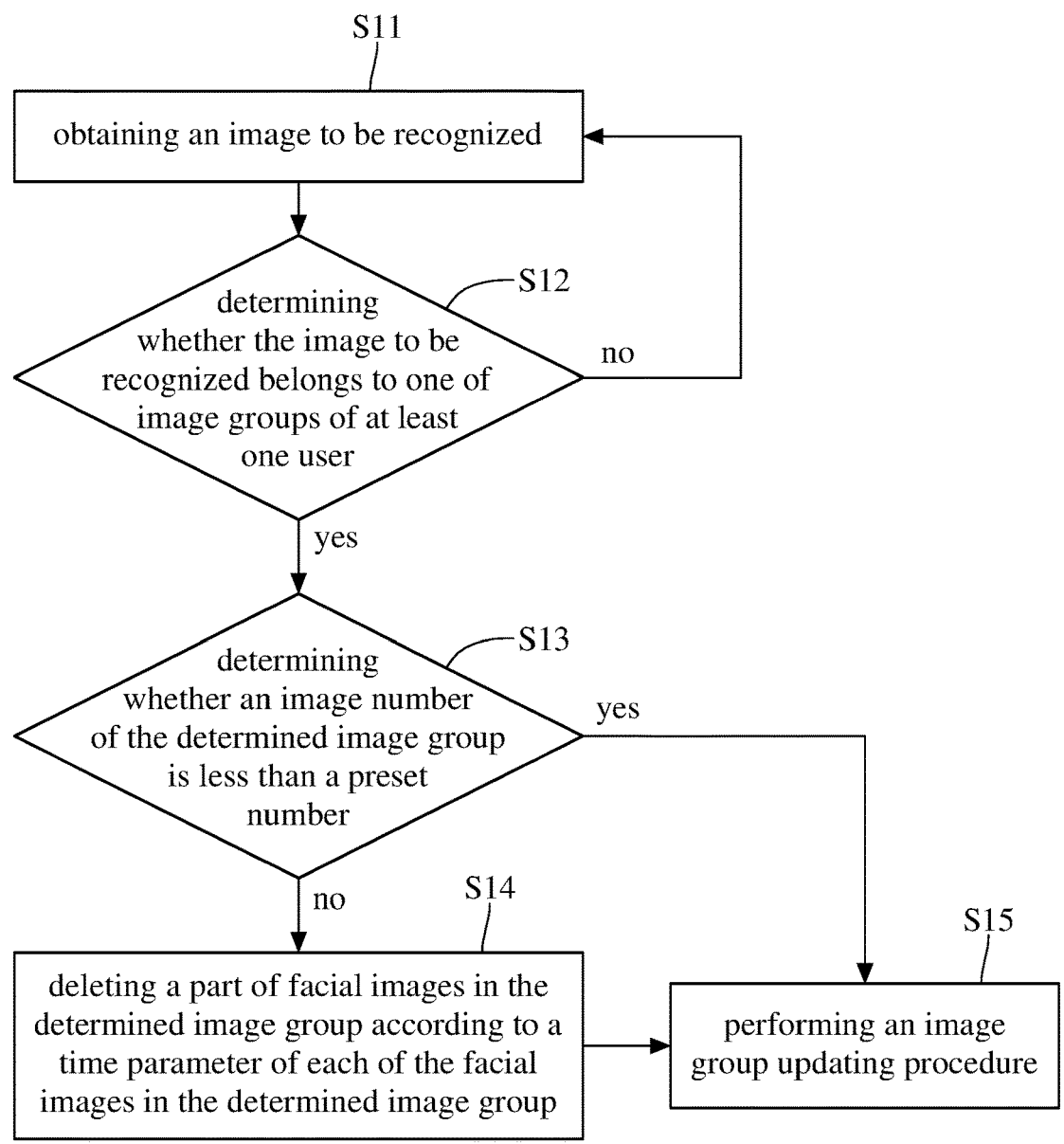
FIG. 2 is a flow chart of a facial recognition method according to an embodiment of this disclosure.

FIG. 2 is a flow chart of a facial recognition method according to an embodiment of this disclosure. The facial recognition method shown in FIG. 2 can be applied to the facial recognition device 1 in the preceding embodiment. In the following, the facial recognition methods in the embodiment of FIG. 2 and other embodiments are exemplarily described using the operation of the facial recognition device 1.

In step S11 shown in FIG. 2, the image capturing device 101 obtains an image to be recognized for the subsequent facial recognition. In several embodiments, the image capturing device 101 is controlled by the processor 103. For example, the facial recognition device 1 can have a distance sensor, and the processor 103 can determine whether an object is close to the facial recognition device 1 according to the detection signal of the distance sensor, and accordingly control the image capturing device 101 to take an image to obtain the image to be recognized; or, the facial recognition device 1 can have a temperature sensor, and the processor 103 can determine whether there is an object with heat (e.g. human) approaching the facial recognition device 1, and accordingly control the image capturing device 101 to take an image to obtain the image to be recognized. In addition to the above sensors, the activation or capturing frequency of the image capturing device 101 of the facial recognition device 1 can also be controlled by the voice, the touch, the trigger of a mechanical button, etc., but is not limited thereto.

After obtaining the image to be recognized, in step S12, the processor 103 determines whether the image to be recognized belongs to one of image groups of at least one user. More particularly, the database 105 stores registration data of one or more users, wherein the registration data of each user includes image groups each of which includes one or more facial images of the corresponding user. For example, the database 105 stores registration data of a first user and registration data of a second user, wherein the registration data of the first user includes first image groups each of which includes one or more facial images of the first user, and the registration data of the second user includes second image groups each of which includes one or more facial images of the second user. The detailed methods of registration and determining which user the image to be recognized belongs to will be described later.

When the processor 103 determines that the image to be recognized belongs to one of the image groups, as described in step S13, the processor 103 further determine whether the image number of the image group to which the image to be recognized belongs (hereafter called "determined image group") is less than a preset number, wherein the image number indicates the number of the facial images in the image group, and the preset number can be a setting parameter of the processor 103, for example, 20 or other values. When the processor 103 determines that the image to be recognized does not belong to any image group, the processor 103 can control the image capturing device 101 to obtain a new image to be recognized, that is, to perform step S11 again.

When the processor 103 determines that the image number of the determined image group is not less than the preset number, as described in step S14, the processor 103 deletes a part of the facial images in the determined image group according to the time parameter of each facial image. The time parameter can indicate the generation time of the image, for example, the time when the image is generated by the image capturing device 101. When the processor 103 determines that the image number of the determined image group is not less than the preset number, 20 for example, the processor 103 deletes the facial image having the earliest generation time (i.e. the older facial image) from the determined image group, so that the more recent 19 facial images remain in the determined image group. In contrast, when the determined result of step S13 generated by the processor 103 indicates that the image number of the determined image group is less than the preset number, that is, less than 20, the processor 103 directly performs the image group updating procedure as described in step 15.

In step S15, the image group updating procedure comprises regrouping all facial images in the image groups of the user to whom the determined image group belongs by a clustering algorithm. In an embodiment wherein the database 105 merely stores the registration data of one user, when the processor 103 performs the image group updating procedure, the processor 103 regroups the image to be recognized and all facial images in all image groups in the database 105 by the clustering algorithm, so as to generate the updated image groups serving as the updated registration data of the user. For example, the difference between the image groups of the same user is resulted from the different facial decorations, such as glasses, beards, etc., worn by the user.

Moreover, in another embodiment wherein the database 105 stores the registration data of multiple users, for example, two users. When the determined image group is one of the first image groups of the first user, the processor 103 regroups the image to be recognized and all facial images in all the first image groups by the clustering algorithm to generate the updated image groups of the first user as the updated registration data of the first user; when the determined image group is one of the second image groups of the second user, the processor 103 generates the updated image groups of the second user in the same way as above. For example, the clustering algorithm is an unsupervised learning clustering algorithm.

By the aforementioned facial recognition method, whenever a new image to be recognized is input into the facial recognition device, the facial recognition device determines whether to remove the old image and add the image to be recognized for the image group updating procedure. Therefore, the facial recognition device may automatically learn with the number of uses to adapt to the gradual changes in user's appearance. Moreover, in the aforementioned facial recognition method, the judgement of whether to remove the old image is merely performed on the image group to which the image to be recognized belongs. In other words, the image newly added to the registration data may merely replace the original facial image with similar features to the image newly added, and may not affect other original facial images with large differences from the image newly added. Therefore, by the facial recognition method of this disclosure, the registration data of a single user may maintain the proportion of images of various appearances.

As mentioned before, the database 101 of the facial recognition device 1 can store the registration data of one or more users. Please refer to FIGS. 1-3, wherein FIG. 3 is a flow chart of a facial recognition method according to another embodiment of this disclosure, and this method is applied to the facial recognition device 1 shown in FIG. 1.

Figure 3:
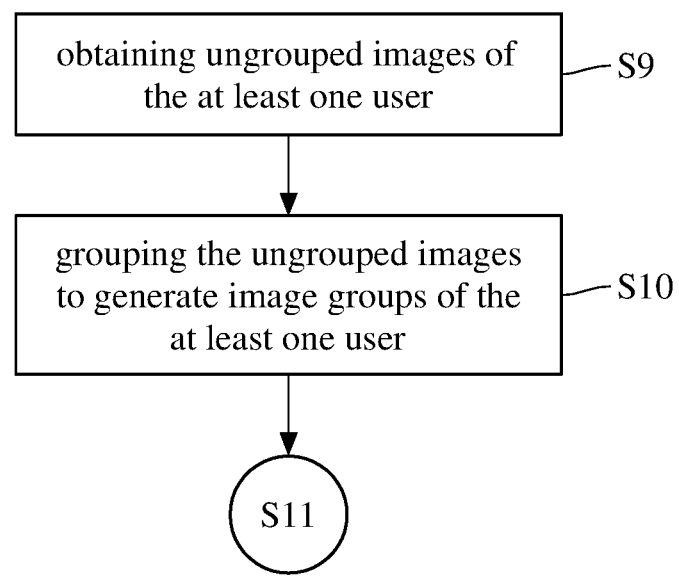
FIG. 3 is a flow chart of a facial recognition method according to another embodiment of this disclosure.

As shown in FIG. 3, before the image capturing device 101 of the facial recognition device 1 obtains the image to be recognized (i.e. step S11 in FIG. 2), in step S9, the image capturing device 101 obtains ungrouped images of one or more users. More specifically, the image capturing device 101 can obtain ungrouped images of one or more users according to a control instruction. The control instruction can instruct the image capturing device 101 to shoot the user to obtain a specific number of the facial images (e.g. only one shot, or a continuous shot of 20), as the aforementioned ungrouped images, and the control instruction can be generated by the voice, the touch, the trigger of a mechanical button, etc., but is not limited thereto.

In step S10, the processor 103 groups the ungrouped images to generate the image groups of one or more users as mentioned in the preceding embodiments, wherein the method of grouping is, for example, the clustering method as mentioned in the preceding embodiments. Therefore, each of the image groups includes one or more facial images. The processor 103 stores the image groups in the database 105 as the registration data of said one or more users. For example, the number of image groups included in the registration data of a single user is up to 5; however, this disclosure does not intend to limit the number of image groups. More particularly, the processor 103 can capture a characteristic of each ungrouped image and convert the characteristic into a point with coordinates, for example, by FaceNet model, and then perform grouping, and store the grouping result in the database 105, so that database 105 stores the respective coordinate data (said point with coordinates) of the facial images of the user. The above embodiment describes the establishment of the registration data of a user. In other embodiments, the facial recognition device 1 can also accept registration requests from multiple users, and then perform the aforementioned steps S9 and S10 for each user, so as to generate the registration data of each user and store the registration data in the database 105.

Figure 4:
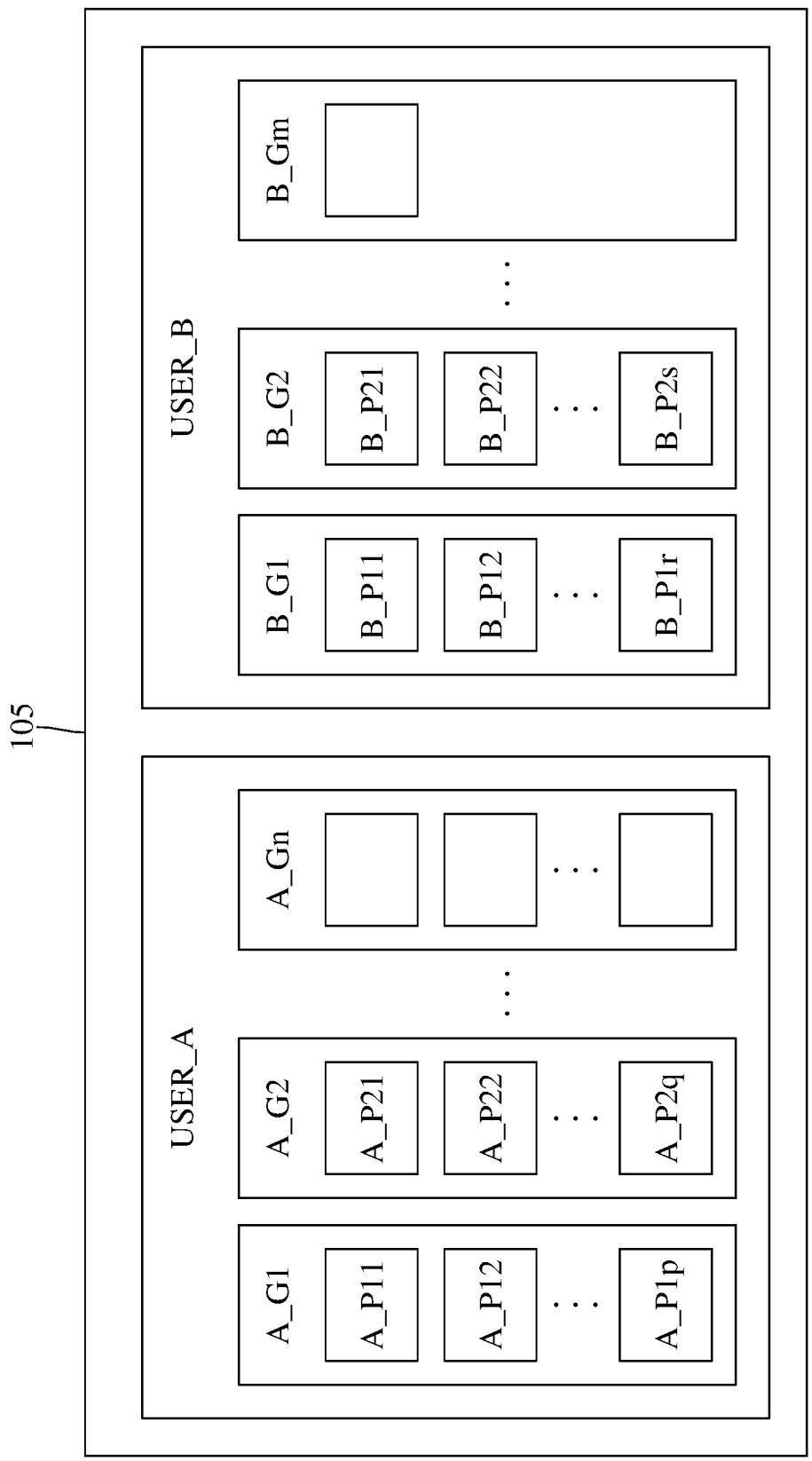
FIG. 4 is a schematic diagram of the registration data of users according to an embodiment of this disclosure.

For illustrating the above registration data, please refer to FIG. 4, wherein FIG. 4 is a schematic diagram of the registration data of users according to an embodiment of this disclosure. FIG. 4 exemplarily illustrates the registration data USER_A and USER_B of two users stored in the database 105. In other embodiments, the database 105 can store the registration data of merely one user or more than two users. As shown in FIG. 4, the registration data USER_A of the first user includes the first image groups A_G1-A_Gn, and the registration data USER_B of the second user includes the second image groups B_G1-B_Gm. In an embodiment, n and m are not larger than 5; that is, the registration data of a user can include up to 5 image groups. Each of the first image groups A_G1-A_Gn includes one or more facial images of the first user, and each of the second image groups B_G1-B_Gm includes one or more facial images of the second user. For example, as shown in the figure, the first image group A_G1 includes facial images A_P11-A_P1p; the first image group A_G2 includes facial images A_P21-A_P2q; the second image group B_G1 includes facial images B_P11-B_P1r; the second image group B_G2 includes facial images B_P21-B_P2s. In several embodiments, each of p, q, r and s is not larger than 20, and the image group can merely include one facial image, as shown in the second image group B_Gm. In an embodiment, the facial image(s) in each of the above image groups can be stored in the database 105 in the form of coordinates, wherein the coordinates of a facial image can be obtained by capturing and converting the characteristic of the facial image by the processor 103.

Figure 5:
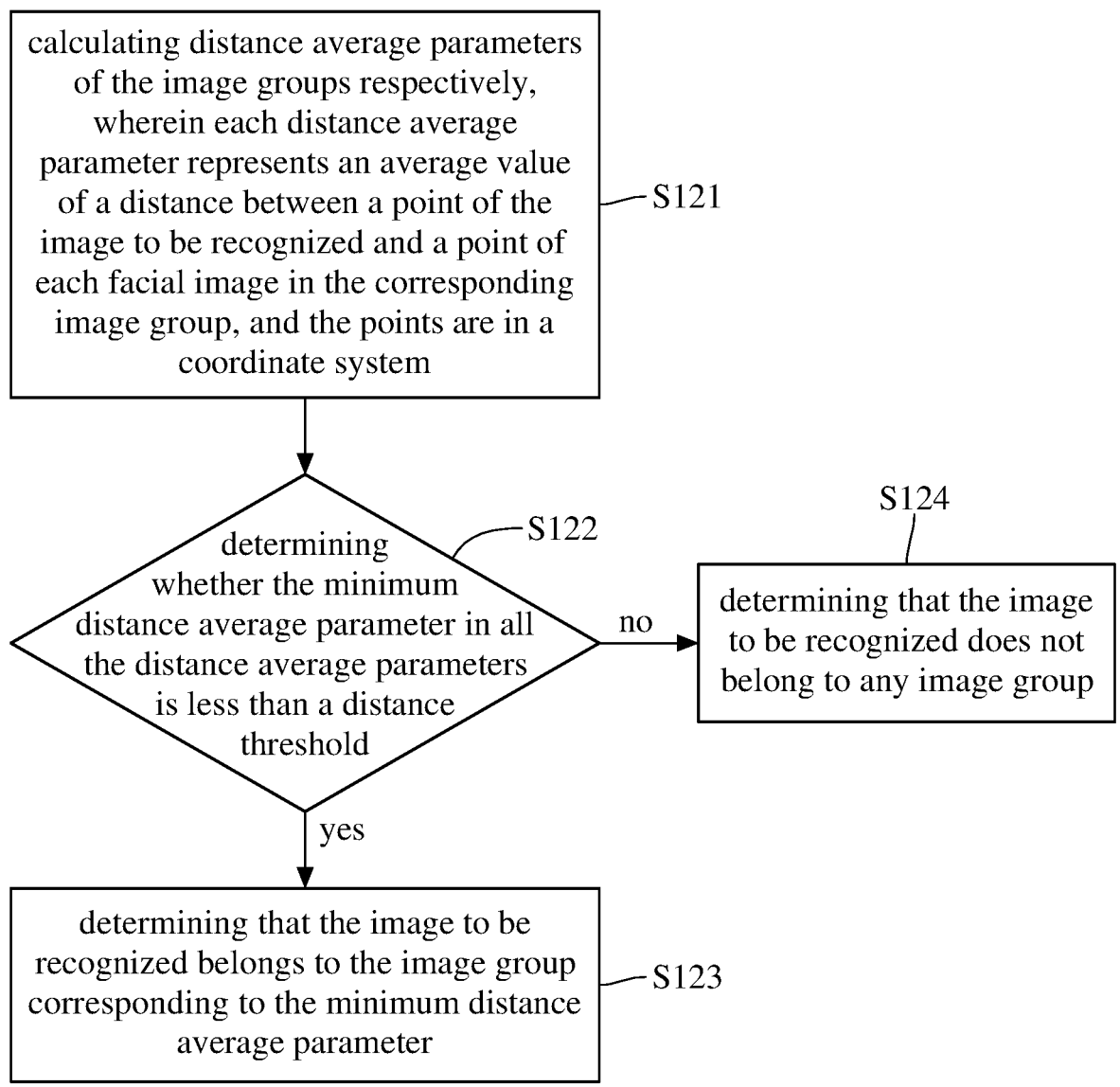
FIG. 5 is a detailed flow chart of a facial recognition method according to an embodiment of this disclosure.

Please refer to FIGS. 1, 4 and 5 for further explaining the determining step S12 in the facial recognition method shown in FIG. 2, wherein FIG. 5 is a detailed flow chart of a facial recognition method according to an embodiment of this disclosure. In step S121, the processor 103 calculates the distance average parameter of each of the image groups in the database 105. The distance average parameter represents the average value of the distance between a point of the image to be recognized and a point of each facial image in the corresponding image group, wherein the points are in the same coordinate system. Using the embodiment of FIG. 4 for further explaining, the processor 103 captures a characteristic of the image to be recognized, and converts (e.g. by FaceNet model) the characteristic into a point with coordinates in the coordinate system where the points of the stored facial images in the database 105 are located, and then calculates the distance (e.g. Euclidean distance) between the point of the image to be recognized and the point of each of the facial images A_P11-A_P1p, A_P21-A_P2q, B_P11-B_P1r and B_P21-B_P2s in the database 105. Then, the processor 103 performs the calculation of a distance average parameter on each of the first and second image groups A_G1-A_Gn and B_G1-B_Gm. For example, the processor 103 can obtain p distances for the facial images A_P11-A_P1p in the first image group A_G1, and the processor 103 calculates the average value of these p distances as the distance average parameter of the first image group A_G1, and the distance average parameters for other image groups are also the same.

In step S122, the processor 103 determines whether the minimum of the distance average parameters of all the image groups (hereafter called "the minimum distance average parameter) is less than a distance threshold. The distance threshold is a setting parameter of the processor 103 and is set to be, for example, between 0-1, and preferably to be 0.3. The smaller the distance average parameter of the image group, the higher the association between the image to be recognized and the image group. In step S123, when the minimum distance average parameter is less than the distance threshold, the processor 103 determines that the image to be recognized belongs to the image group corresponding to the minimum distance average parameter; that is, the image group corresponding to the minimum distance average parameter is determined to be the determined image group as described in the preceding embodiments. On the contrary, in step S124, when the minimum distance average parameter is not less than the distance threshold, the processor 103 determines that the image to be recognized does not belong to any image group, and controls the image capturing device 101 to re-obtain a new image to be recognized.

The facial recognition methods described in the preceding embodiments can be in the form of code, and be stored in a non-transitory computer readable medium which is readable for a computing device such as a computer, a tablet, cellphone, etc. For example, the non-transitory computer readable medium is a CD, a flash drive, a memory card, a hard drive of a cloud server, etc. When a computing device loads the code from the non-transitory computer readable medium and executes the code, the computing device can perform the operation of the facial recognition method described in the above one or more embodiments. Moreover, it should be noted that the update method in the facial recognition method described in the preceding embodiment, which involves the concepts of adjusting the original registration data according to the data to be recognized and adding the data to be recognized into the original registration data for reclassification, can also be applied to other biometric technologies, such as the recognition of fingerprints, palm prints, irises, retinas, sounds, etc.

In view of the above, the method, device and non-transitory computer readable medium of facial recognition provided in this disclosure can adjust a specific image group in the registration data of a user when obtaining a new image to be recognized, and then perform the image group updating procedure, wherein the new image to be recognized belongs to the specific image group. Therefore, the method, device and non-transitory computer readable medium of facial recognition provided in this disclosure can automatically learn with the number of uses to adapt to the gradual changes in user's appearance, and then the accuracy and speed of facial recognition may be improved. Since the method, device and non-transitory computer readable medium of facial recognition provided in this disclosure merely performs image deletion on the image group to which the image to be recognized belongs, the registration data of a single user may maintain the proportion of images of various appearances, and therefore, when a user wears an external accessory, the method, device and non-transitory computer readable medium of facial recognition provided in this disclosure may still have a good recognition accuracy.

What is claimed is:

1. A facial recognition method, comprising:
    obtaining an image to be recognized;
    determining whether the image to be recognized belongs to one of image groups of users;
    when the image to be recognized belongs to a determined image group in the image groups, determining whether an image number of the determined image group is less than a preset number;
    when the image number of the determined image group is not less than the preset number, deleting one of facial images in the determined image group according to time parameters of the facial images in the determined image group, and performing an image group updating procedure; and
    when the image number of the determined image group is less than the preset number, performing the image group updating procedure;
    wherein the image group updating procedure comprises regrouping the image to be recognized and all facial images in all of the image groups of one of the users to whom the determined image group belongs by a clustering algorithm, so as to generate updated image groups of the one of the users to whom the determined image group belongs,
    wherein the users comprise a first user and a second user, the image groups comprises first image groups of the first user and second image groups of the second user, and the step of performing the image group updating procedure further comprises:
    when the determined image group belongs to one of the first image groups, regrouping the image to be recognized and all facial images in all of the first image groups by the clustering algorithm to generate the updated image groups of the first user; and
    when the determined image group belongs to one of the second image groups, regrouping the image to be recognized and all facial images in all of the second image groups by the clustering algorithm to generate the updated image groups of the second user.

2. The facial recognition method according to claim 1, wherein the step of determining whether the image to be recognized belongs to the one of image groups of the one of the users comprises:
    calculating distance average parameters of the image groups respectively, wherein each of the distance average parameters represents an average value of a distance between a point of the image to be recognized and a point of each of one or more facial images in the corresponding image group, and the points are in a coordinate system;
    determining whether a minimum distance average parameter in the distance average parameters is less than a distance threshold; and
    when the minimum distance average parameter is less than the distance threshold, determining that the image to be recognized belongs to the image group corresponding to the minimum distance average parameter.

3. The facial recognition method according to claim 2, wherein the distance between the point of the image to be recognized and the point of each of one or more facial images belongs to Euclidean distance.

4. The facial recognition method according to claim 1, wherein before the step of obtaining the image to be recognized, the facial recognition method further comprises:
    obtaining ungrouped images of the one of the users; and
    grouping the ungrouped images to generate the image groups of the one of the users.

5. The facial recognition method according to claim 1, wherein each of the time parameters is associated with a time when the corresponding facial image is generated.

6. A facial recognition device, comprising:
    an image capturing device configured to obtain an image to be recognized;
    a database configured to store image groups of users; and
    a processor electrically connected with the image capturing device and the database, and configured to determine whether the image to be recognized belongs to one of the image groups of one of the users, to determine whether an image number of a determined image group is less than a preset number when the image to be recognized belongs to the determined image group in the image groups, to delete one of facial images in the determined image group according to time parameters of the facial images in the determined image group and perform an image group updating procedure when the image number of the determined image group is not less than the preset number, and to perform the image group updating procedure when the image number of the determined image group is less than the preset number;
    wherein the image group updating procedure comprises regrouping the image to be recognized and all facial images in all of the image groups of the one of the users to whom the determined image group belongs by a clustering algorithm, so as to generate updated image groups of the one of the users to whom the determined image group belongs,
    wherein the users comprise a first user and a second user, the image groups comprises first image groups of the first user and second image groups of the second user, and the step of performing the image group updating procedure further comprises:
    when the determined image group belongs to one of the first image groups, regrouping the image to be recognized and all facial images in all of the first image groups by the clustering algorithm to generate the updated image groups of the first user; and when the determined image group belongs to one of the second image groups, regrouping the image to be recognized and all facial images in all of the second image groups by the clustering algorithm to generate the updated image groups of the second user.

7. A non-transitory computer readable medium, comprising a code, wherein the code is configured to be executed by one or more processors so as to perform a facial recognition method comprising:

obtaining an image to be recognized;

determining whether the image to be recognized belongs to one of image groups of users;

when the image to be recognized belongs to a determined image group in the image groups, determining whether an image number of the determined image group is less than a preset number;

when the image number of the determined image group is not less than the preset number, deleting one of facial images in the determined image group according to time parameters of the facial images in the determined image group, and performing an image group updating procedure; and when the image number of the determined image group is less than the preset number, performing the image group updating procedure;

wherein the image group updating procedure comprises regrouping the image to be recognized and all facial images in all of the image groups of one of the users to whom the determined image group belongs by a clustering algorithm, so as to generate updated image groups of the one of the users to whom the determined image group belongs, wherein the users comprise a first user and a second user, the image groups comprises first image groups of the first user and second image groups of the second user, and the step of performing the image group updating procedure further comprises:

when the determined image group belongs to one of the first image groups, regrouping the image to be recognized and all facial images in all of the first image groups by the clustering algorithm to generate the updated image groups of the first user; and when the determined image group belongs to one of the second image groups, regrouping the image to be recognized and all facial images in all of the second image groups by the clustering algorithm to generate the updated image groups of the second user.

8. The non-transitory computer readable medium according to claim 7, wherein the step of determining whether the image to be recognized belongs to the one of the image groups of the users comprises:

calculating distance average parameters of the image groups respectively, wherein each of the distance average parameters represents an average value of a distance between a point of the image to be recognized and a point of each of one or more facial images in the corresponding image group, and the points are in a coordinate system;

determining whether a minimum distance average parameter in the distance average parameters is less than a distance threshold; and when the minimum distance average parameter is less than the distance threshold, determining that the image to be recognized belongs to the image group corresponding to the minimum distance average parameter.

9. The non-transitory computer readable medium according to claim 8, wherein the distance between the point of the image to be recognized and the point of each of one or more facial images belongs to Euclidean distance.

10. The non-transitory computer readable medium according to claim 7, wherein before the step of obtaining the image to be recognized, the facial recognition method further comprises:

obtaining ungrouped images of the one of the users; and grouping the ungrouped images to generate the image groups of the one of the users.

11. The non-transitory computer readable medium according to claim 7, wherein each of the time parameters is associated with a time when the corresponding facial image is generated.

* * * * *